May 3, 1960 J. T. JOHNSON 2,934,959
LIQUID SAMPLING APPARATUS
Filed March 14, 1955
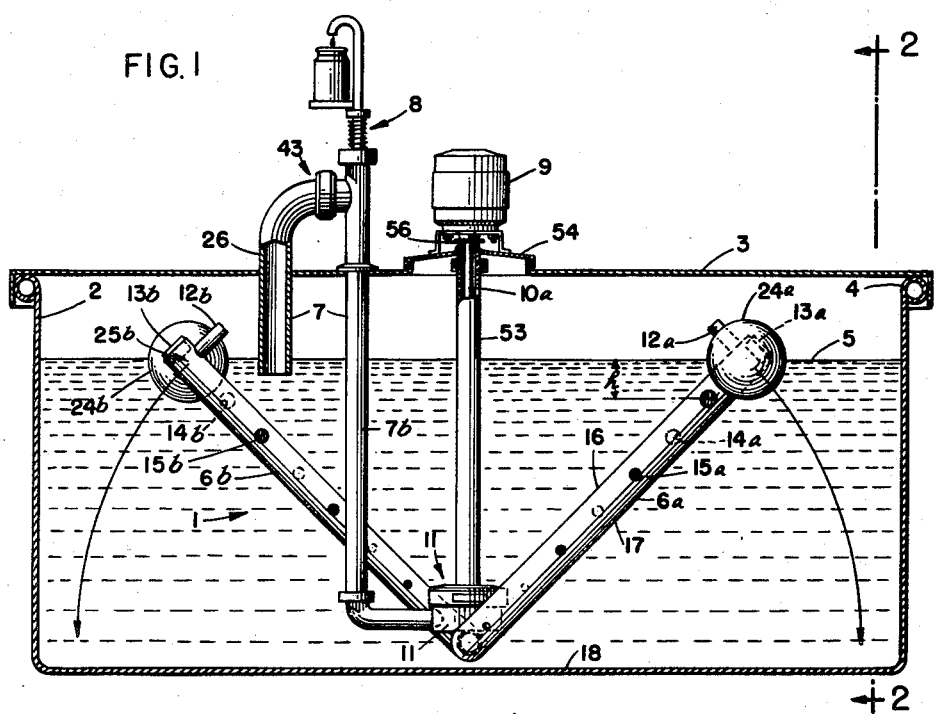
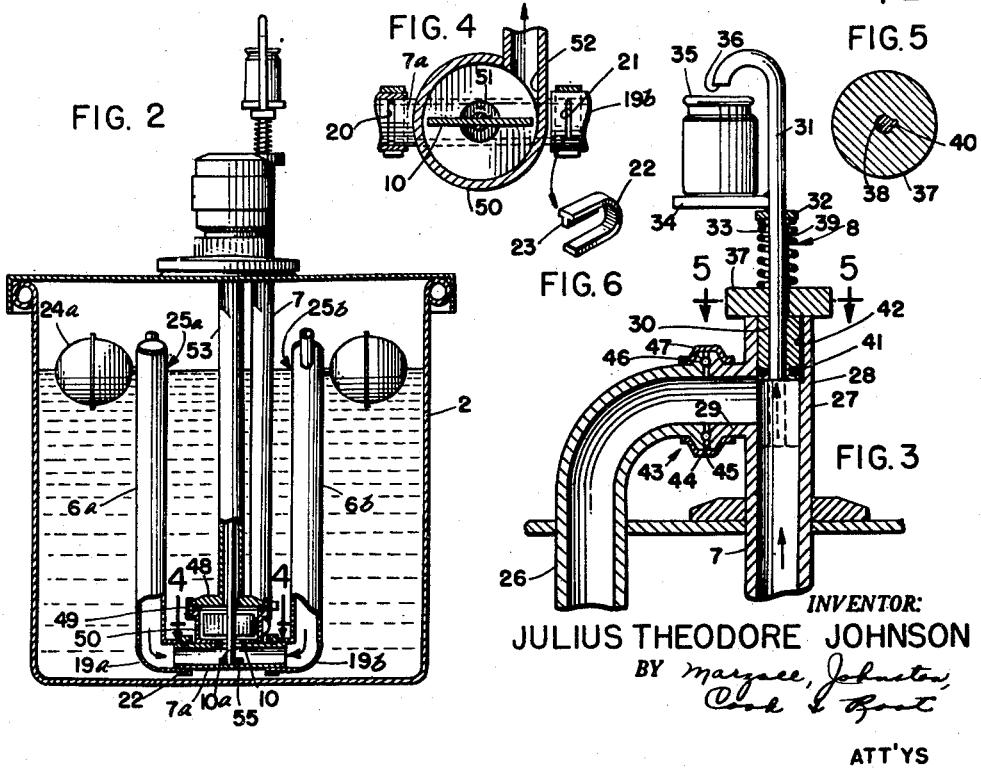
INVENTOR:
JULIUS THEODORE JOHNSON
BY Marzall, Johnston, Cook & Root
ATT'YS United States Patent Office 2,934,959
Patented May 3, 1960

2,934,959
LIQUID SAMPLING APPARATUS
Julius Theodore Johnson, Clinton, Iowa
Application March 14, 1955, Serial No. 494,184
3 Claims. (Cl. 73—422)

This invention relates to liquid sampling apparatus, particularly useful in sampling liquids which stratify. The invention is especially advantageous in sampling milk, particularly at the time the milk is received and during the weighing period.

Milk delivered to dairies is commonly poured from its containers into weigh tanks which collect the milk from one source for weighing, and a sample of each tankful is taken for the determination of butterfat content. It is highly desirable that the sample be as nearly representative as possible in order that accurate control may be maintained and so that the valve of the milk, which depends upon the butterfat content, is correctly determined. At the same time, it is necessary that the sample be taken very quickly and not interfere with the receiving and processing operations, which take place at a rapid rate.

Previously, a number of devices and methods had been employed to sample the milk in the weigh tank, such as by removing a sample in the form of a vertical core from the tank or by employing relatively complicated and expensive sampling devices. These methods suffered from the disadvantage of excessive equipment cost for accurate sampling, or of excessive time consumption. In some cases, sampling is not as accurate as desired.

It is, therefore, an object of the present invention to provide a new and improved milk sampling apparatus which overcomes the prior disadvantages and which is also adapted for use in sampling other liquids which tend to stratify. The invention is especially suited for very rapid yet accurate sampling while in no way interferring with plant operations.

A particular object is to remove a representative sample of liquid from a column thereof, in a suitable vessel, by withdrawing a plurality of small samples at a number of points distributed over the liquid column, particularly at vertically spaced points to obtain samples at the several layers or strata. The small samples are then collected together so that they form a representative sample of the liquid, and a portion can then be analyzed to give a reliable indication of the contents of the vessel. This is especially important in the sampling of milk, since the milk tends to stratify rapidly, with the butterfat ascending. Preferably, the sample points are also spaced horizontally over the column of liquid, inasmuch as the butterfat content often varies across a vessel as well as in the vertical direction.

Another object is to provide an apparatus for simultaneously withdrawing samples of the liquid in a column at various points and at equal volumetric rates, so that the sample corresponds closely to the actual composition and a disproportionate amount of liquid is not withdrawn from one or more points.

A further object is to provide an apparatus for removing a sample for testing simply and rapidly and, in fact, almost instantaneously.

An additional object is to provide a sampling operation wherein the weighing operation is not affected, the total quantity of the liquid always remaining on the scale and none being withdrawn and requiring a correction therefor.

A further object is to provide an operation which is simply and reliably carried out by one person and without interference with the weighing operation.

Another object is to provide an apparatus for automatically withdrawing a representative sample at any liquid level in the tank, with no need for alteration or adjustment of the apparatus.

Yet another object is to provide an apparatus which is easily and economically constructed and which meets high sanitary requirements.

An additional object is to provide a sampler which continuously cleanses itself, so that a representative sample may be taken almost instantaneously when the total amount of the liquid has been placed in the vessel or it is full.

A further object is to provide an especially advantageous combination of a weigh tank for milk and sampling apparatus mounted thereon, furnishing improved results in the weighing and sampling operations.

These and other objects and advantages of the invention will appear on consideration of the specification taken in conjunction with the accompanying drawings, in which like reference characters are employed in each of the views to designate like parts, and in which Fig. 1 is a side elevational and partly sectional view, with parts broken away, of one embodiment of the invention, illustrating a sampling apparatus mounted on a weigh tank;

Fig. 2 is an end elevational and partly sectional view of the apparatus, taken on line 2—2 of Fig. 1;

Fig. 3 is an enlarged elevational sectional view of a part of the sampling apparatus, illustrating the apparatus for removing a sample for testing from the sample conveying and recycling duct;

Fig. 4 is a fragmentary enlarged sectional plan view of the pump of the sampling apparatus, taken on line 4—4 of Fig. 2;

Fig. 5 is a sectional view of the cap on the sample removing apparatus, taken on line 5—5 of Fig. 3; and Fig. 6 is a perspective view of the U-clamp which secures the sampler ducts to the pump.

The invention resides in the new construction and the combination and arrangement of the elements thereof and, in particular, in the combination of means providing simple, rapid and accurate sampling. A new method for obtaining a truly representative sample from a body of liquid is provided, especially useful in sampling milk.

In certain of its broader aspects, a new liquid sampling device is supplied which includes means for simultaneously admitting a plurality of liquid streams from a column of liquid to a liquid collector through a corresponding plurality of orifices spaced upwardly of the column, the orifices decreasing in area downwardly of the column, and means for removing the liquid from the collector. Preferably, the orifice area is inversely proportional to the square root of $2gh$, where $g$ is the acceleration due to gravity, and $h$ is the height of the liquid level above the orifice.

In an especially advantageous embodiment, the admitting means and liquid collector constitutes a sampler duct or tube provided with a plurality of longitudinally spaced apertures. The sampler duct is inserted in the liquid so that it extends substantially from top to bottom for collecting samples at points distributed vertically in the liquid. It is further preferred that the duct extend across the liquid, so that samples are also taken at spaced horizontal intervals. The duct is mounted for automatic movement or adjustment with a change in the level of the liquid, so that a representative sample is taken at all times. The sampler duct is connected at its lower end to a conveyor or drain duct, and means are provided for removing the liquid from the conveyor and sampler ducts at a rate substantially as great as it is admitted to the sampler duct. Preferably, means are provided for forcing the liquid collected through the conveyor duct and back to the liquid body or column, recycling the liquid. A sample for testing is removed from the conveyor duct, preferably in instantaneous fashion by means of apparatus constructed for such removal.

There is also provided the unitary combination in a milk receiving apparatus, of a weigh tank and a sampling apparatus mounted thereon and which is weighed with the tank and contents. The apparatus is especially adapted for maintaining all of the milk on the scale at all times, so that only one weighing with no correction is required. The sampling apparatus is thus also in close proximity to the weigh tank for correlating the operations, and the milk is continuously recycled to provide continuous self-cleansing and agitation due to the liquid circulation.

The invention provides a new method of sampling milk involving the simultaneous withdrawal of a plurality of samples at vertically spaced points from a column of milk through corresponding apertures which decrease in area downwardly in proportion to the height of the liquid level above the apertures, to remove a sample of the milk at substantially the same volumetric rate flow at each of the spaced points. The samples are collected together and removed substantially as rapidly as they are withdrawn, a portion of the collected samples is withdrawn for analysis, and the collected samples are recycled.

Referring to the drawings, Fig. 1 illustrates a liquid sampling device or apparatus, generally indicated by the numeral 1 mounted on a milk weigh tank, vessel or container 2, the apparatus being supported by a suitable cover, plate or member 3 which is in turn seated on the rim 4 at the top of the weigh tank. The weigh tank is illustrated as being filled with a liquid such as milk up to a level 5, which was reached, for example, in dumping the contents of a number of cans of milk from one farmer into the tank for weighing. This level will vary with the size of each lot of milk, and the sampling apparatus is adapted to take a representative sample whatever the liquid level may be.

The sampling apparatus 1 includes a pair of like upwardly directed sampler ducts, tubes or conduits 6a and 6b which are connected to a conveyor duct, tube or conduit 7, to which is connected sample removing means or apparatus 8. Means for removing the liquid from the sampler ducts or arms 6a and 6b and conveying or forcing it through the conveyor duct 7 are provided in the form of a liquid pumping apparatus including a motor 9 which drives an impeller 10 of a pump 11 by means of an impeller shaft 10a.

The interior of each of sampler ducts 6a and 6b is open to the atmosphere at its upper end through a vent or breather tube 12a or 12b, which is open to the atmosphere at its free end and to the duct at the end fixed thereto. These openings are always kept above the liquid level 5. The upper ends of the sampler ducts are plugged with plugs or stoppers 13a and 13b, removable for inspecting and cleaning the ducts. Each sampler duct is longitudinally perforated at spaced intervals, having a series of equidistantly spaced orifices, apertures, holes or openings 14a and 15a, and 14b and 15b, respectively. In the embodiment shown, equidistant alternate openings 14a and 14b are provided in a row on one side of the wall of each duct, and equidistant alternate openings 15a and 15b are provided in a row on the opposite side. This construction serves to withdraw samples in both lateral directions and also at different elevations. Preferably, as shown, each sampler duct is inclined from the vertical so as to extend in the horizontal direction over a considerable portion of the length or breadth of the weigh tank 2. The sampler ducts 6a and 6b incline in opposite directions, and they are spaced laterally. In this manner, sample portions are withdrawn in different areas laterally, longitudinally, and vertically.

The orifices or apertuers 14a, 14b, 15a and 15b may be otherwise located in the wall of the sampler duct; for example, they may all be on one side, or they may be on the top surface 16 (duct 6a) or bottom surface 17 of the duct. In the embodiment illustrated, the bottom 17 of the duct is free of orifices, avoiding interference of the liquid draining down the duct with that entering through the orifices.

The orifices preferably decrease in area downwardly in proportion to the height $h$ of the liquid level 5 above the orifices. In order to obtain a representative sample, it is necessary that the volumetric rate of flow of the liquid withdrawn through the orifices be the same for each orifice. Since the liquid streams or jets discharge through the orifices against a lesser pressure, about atmospheric pressure, the orifices decrease in area downwardly to compensate for the increased hydrostatic pressure in a downward direction. Thus, the velocity of flow through each orifice is determined by the formula $\text{Vel.} = (2gh)^{1/2}$ wherein $g$ is the acceleration due to gravity, 32.16 feet per sec.$^2$, and $h$ is the height of the liquid level 5 above the orifice, as illustrated for one orifice in Fig. 1. The area is then inversely proportioned to the square root of $2gh$.

The volumetric rate of flow of liquid through the sampling apparatus 1 is predetermined according to the requirements of the situation, as is the number of orifices required for good sampling. The volumetric rate of flow desired through each orifice is then determined by dividing the total volumetric flow by the total number of orifices. Letting V represent the volumetric rate of flow through each orifice, then $V = A(\text{Vel.}) = A(2gh)^{1/2}$, where A is the area of a given orifice, and $h$ is the liquid level height for the orifice, as described above. The area for a particular orifice is then determined by solving the equation for A, so that the formula for the area is $$A = \frac{V}{(2gh)^{1/2}}$$

The area is determined for each orifice at a predetermined position of the sampler duct 6a or 6b, which would be the lowest or most nearly horizontal position of the duct normally encountered where the minimum desired value of V is calculated. The position of the sampler duct determines the value of $h$ for each orifice. In the embodiment shown, the sampler ducts 6a and 6b are duplicates, and they are mounted in the same manner. Their orifice sizes and spacings are duplicates, although they can be changed as long as each orifice gives the same volumetric flow rate therethrough at each liquid level.

The above formula by which the area is determined holds true whatever the position of the duct, so that the areas A need be calculated but once, for one position of the duct. The areas then provide equal volumetric rates of flow through the several orifices 14a, 14b, 15a and 15b in each of the several positions of the duct. However, the flow through each orifice and the total flow is greater at the higher elevations corresponding to higher liquid levels 5 than at lower elevations and liquid levels.

Due to losses at the orifices, the volumetric rate of flow V through each orifice is less than calculated by the formula, so that the values must be corrected. It has been found that in the apparatus employed for certain standard milk weighing and sampling operations, the correction factor for each orifice is substantially the same for orifices of the same shape. For example, it has been found that the volumetric rate of flow calculated by the formula is to be multiplied by a constant loss factor K of about 0.8 to obtain the actual flow, in the case of circular orifices dimensioned to provide about 1 cubic inch of milk through each orifice per second. Orifices or openings of other shapes might be employed, having regard to the above considerations and likewise experimentally determining the correction factor to be applied in the calculations.

A weigh tank 2 of representative size in the industry may hold about 500–700 pounds of milk. Each sampler duct or arm 6a or 6b may be, for example, about 18 inches long and have 7 circular orifices spaced at two inch intervals. The ducts are mounted so that the orifices are spaced equidistantly from the liquid level 5 to the bottom or floor 18 of the tank. As examples of the several values referred to above, when the uppermost orifice 15a is 1 inch below the liquid level 5 or $h=1$ inch, the velocity, Vel., through the orifice is about 27.8 inches per second. In order to obtain an actual volumetric flow rate V through this orifice of 0.8 cubic inch per second, V is divided by the loss factor, $K=0.8$, in the calculations, and the area $$A = \frac{V}{K \times \text{Vel.}} = \frac{0.8}{0.8 \times 27.8} = 0.0360 \text{ square inch}$$

The diameter of the circular orifice is then 0.214″. Similarly, to give an actual flow of 0.8 cubic inch per second through the orifice, an orifice 2 inches below the liquid level would have a diameter of 0.18″. The total flow through 14 orifices would be $0.8 \times 14 = 11.2$ cubic inches per second.

If the calculation were based on a position of the duct 6a or 6b in which it was inclined from the vertical, elevating the duct would increase the vertical distance between the orifices and thus the values for $h$, so that the volumetric rate of flow through each orifice would be correspondingly greater. However, the new flow rate would be the same for each orifice. Similarly, lowering the duct, towards the horizontal position, would decrease individual flow rates but they would remain equal. In this manner, the diameters of the apertures or orifices are once determined, and the quantity of sample withdrawn through each orifice is the same for every orifice in each position of the duct, but the volume flow rates vary with the position of the duct.

The sampler ducts 6a and 6b are rotatably connected to a tubular manifold or header 7a of the conveyor duct 7. The sampler ducts terminate at their lower ends in elbows 19a and 19b which form swivel joints with the open manifold ends. Adjacent each end of the manifold 7a is a transverse peripheral groove 20 (see Fig. 4) which is cut part way into the tube wall. The peripheral groove registers with a corresponding slot 21 adjacent the free end of the sampler duct elbow 19a or b. To make the swivel joint connection, a removable U-clip or spring clamp 22 (Fig. 6) having a T-section or key 23 slides into position over each elbow with the key extending through the slot 21 into the groove 20, locking the duct and manifold against relative lateral movement while allowing the duct to rotate freely on the manifold. In this manner the conveyor duct 7 and the sampler ducts 6a and 6b are rotatably or pivotally connected relative to each other, for free vertical rotation of the sampler duct.

Instead of two sampler ducts, only one may be employed, if desired, or additional sampler ducts may be employed for more extensive sampling. They may extend in different directions and at different elevations, and they may have different arrangements of orifices.

A float 24a or 24b is rigidly connected to each sampler duct, to automatically position or locate the sampler duct with a change in the level of the surrounding liquid, the sampler duct rotating accordingly. The float maintains the sampler duct in position such that the open ends of the vent tubes 12a and 12b remain above the liquid level 5, and the orifices are spaced uniformly down the column or body of liquid. The floats are fixed to the sides of the respective sampler ducts so that one point 25a or 25b adjacent the upper end of each duct is always coincident with the liquid level or surface 5. In this manner, the uppermost orifice always retains its proper spacing from the liquid level.

The liquid in the tank, being milk in dairy operations, continuously flows through the orifices 14a, 14b, 15a and 15b in rapid jets or streams which impinge on the opposite side of the ducts and drain by gravity down the ducts, and into the manifold 7a of the conveyor duct 7. When the motor 9 is running, the impeller 10 withdraws the milk from the bottom of the sampler ducts 6a and 6b and the manifold 7a, and pumps it through the riser 7b of conveyor duct 7, past the sample removing apparatus or take-off 8 and through the downspout 26 of the conveyor duct into the milk in the tank 2, recycling the milk.

The motor and pump have capacities greater than necessary to remove the milk from the sampler ducts 6a and 6b as rapidly as it will enter the sampler ducts through the orifices, and they are operated to remove the milk at a rate substantially as great as it enters the sampler ducts.

In this manner, a plurality of streams of milk corresponding to the number of orifices continuously enter the sampler ducts and descend in free fall or flow to the lowermost and submerged ends of the ducts, the ends towards which the orifices decrease in area. There is constantly entering the manifold 7a a representative mixture of milk which is immediately withdrawn, conveyed to the sample removing apparatus 8, and recycled. At any instant, milk is entering the sampler duct which is representative of the milk in the tank 2 at that time, and in a very small time interval thereafter, approaching instantaneously, that milk passes the sample removing attachment 8. At the same time, the system is continuously being flushed with fresh milk, and the milk immediately preceding the sample removed at the take-off 8 differs if at all but very slightly from the sample, so that the results are exceedingly accurate. Thus, the apparatus is in operation as milk is being dumped into the weigh tank 2. When charging is complete, the system has just been flushed with milk of the same or almost the same composition as the final composition, and a representative sample of the complete charge is obtained nearly instantaneously.

A novel and much improved feature of the invention resides in the construction and arrangement of the sample removing apparatus 8 and its combination with the conveyor duct 7. In the preferred construction illustrated, the sample take-off 8 is connected to the conveyor duct 7 at a reducing T connection 27. The T connection includes a straight run component 28 of reduced cross-section and an enlarged laterally extending tube or conduit 29 of enlarged cross-section normal to the straight run component 28. Employing the enlarged side arm 29, the milk no longer fills the duct when it reaches the side arm, so that it is no longer under the pumping pressure.

The sample removing apparatus 8 is mounted on one end of the straight run portion of the T connection and includes a plunger or piston 30, a hollow sample removing tube or gooseneck 31, a retaining ring and stop member 32 fixed thereto, a compression spring 33 and a sample bottle platform 34 which may be fixed to the tube and arranged for supporting a sample bottle 35 in position to receive a sample below the discharge mouth or end 36 of the sample removing tube. The plunger 30 and the sample removing tube 31 secured in an axial bore therein are mounted for vertical reciprocation in the straight run portion 28 of the T connection, to and from a position across the inner end of the side arm component 29, as illustrated in broken line in Fig. 3.

The sample removing tube 31 moves or reciprocates freely through a ring cap or support 37 provided with a corresponding central tubular opening 38, which is mounted in fixed position on the free end of the T connection 27. A key 39 is fixed to the tube 31 below the stop 32, fitting in a keyway 40 in the cap 37 to fix the position of the tube. This construction is especially useful where the sample bottle platform is not used or is not fixed to the removing tube 31. The compression spring 33 loosely encircles the sample removing tube 29 and rests on the cap 37. It is positioned between the cap 37 and the retaining ring 32, and normally supports the plunger 30 and the tube 31 with the plunger in withdrawn position against the cap.

When downward pressure is exerted on the sample removing tube 31, the spring 33 is compressed and the tube and plunger 30 enter the conveyor duct as described above, to restrict the flow of milk and cause a portion of the milk to enter the sample removing tube, as illustrated by the broken arrow in Fig. 3. Substantially instantaneously, a sample is diverted through the plunger 30 and the central tube 31 and discharges from the open end 36 of the tube into the sample bottle 35, which moves with the tube and plunger due to its being seated on the platform 34 which is fixed to the tube. When pressure is removed from the sample removing tube 31, the tube and plunger withdraw from the conveyor duct 7 immediately and automatically.

When the plunger 30 is in withdrawn position, milk flows out the side arm 29 into the downspout 26 and back into the tank 2. Since in the connection of the side arm 29 to the straight run component 28, the area of the T connection 27 is enlarged, the conveyor duct 7 is no longer filled with liquid as it is when approaching the T connection, and there is insufficient pressure to cause the milk to be diverted through the sample removing tube 31 when the plunger 30 is in withdrawn position. In an alternative construction, with the T connection below the cover 3, the side arm 29 and downspout 26 may be eliminated.

An O-ring or gasket 41 is located in a corresponding peripheral groove or slot of the plunger 30, to form a seal with the T connection 27 when the plunger is in its inserted position. A vertical groove, slot or recess 42 is provided in the free end portion of the T connection 27, for draining any milk adhering around the plunger 30 when it is in withdrawn position.

The sampling device is constructed of a minimum of connections and elements, to provide the most sanitary construction which is easily kept clean, inspected and cleaned. To this end, duct or tube components are connected by unions as illustrated at 43 in Fig. 3. Other like connections are provided in the assembly. The union 43 includes abutting faces 44 and 45 on adjoining members, a rubber or like ring gasket 46 provided between the faces and seated in corresponding circular grooves therein, and a circular clamp 47 holding the members and faces together.

The pump 11 is of simple construction for ready disassembly, and includes a cover plate 48 joined by clamps 49 to a body 50. Centrally of the bottom of the body is an inlet opening 51 at which is connected the manifold 7a, for draining the manifold. In the side of the body 50 is a discharge opening 52 which is connected to the riser portion 7b of the conveyor duct 7 leading to the sample removing apparatus 8. The pump 11 is supported within the weigh tank 2 by a tubular support 53, which is in turn supported by a base 54 seated on the cover 3. The impeller shaft 10a is enclosed by the support 53 in a manner which avoids air binding, the support venting the pump to the surface, and the bottom end of the shaft is seated in a bearing 55 secured within the manifold 7a for this purpose.

The motor 9 is also mounted on the base 54. It will be noted that a liquid deflector 56 is fixed to the impeller shaft 10a adjacent the motor 9, and it extends over upturned portions of the base 54. The base 54 is likewise downturned and extends over the cover 3 and an upturned portion thereof. This construction serves to prevent any oil or other liquid or foreign matter from entering the weigh tank 2, causing it to run off instead, to preserve sanitary conditions.

It will be apparent that numerous changes can be made in the construction and arrangement of the components of the invention while achieving its objects and without departing from the spirit and scope thereof. Thus, for example, instead of being tubular as illustrated, the ducts may take other forms, such as square. The orifices may be other than circular, although this is preferred. Instead of providing a swivel joint connection between the manifold 7a and the ducts 6a and 6b, a flexible coupling such as a rubber or plastic tube might be employed. Other means or arrangements may be substituted for withdrawing the liquid from the sampler duct, including pressure or suction means. The riser 7b may be a flexible coupling, for elevating and adjusting the sample removing apparatus 8 as desired. The sample removing apparatus 8 and its connection to the conveyor duct 7 may be altered while still providing the improved results in obtaining a sample. For example, a connection other than the particular T connection can be employed, and the plunger may be inserted into the conveyor duct in other relationships to the stream of liquid. Resilient means other than spring 33 may be substituted. Means other than floats 24a and 24b may be employed for automatically adjusting the positions of the sampler ducts with variations in the liquid level.

In this manner, new apparatus and a new sampling method are furnished which constitute significant improvements, especially in sampling milk as takes place in a dairy. A simple and yet very efficient sanitary construction is provided which furnishes a very uniform and truly representative sample substantially instantaneously. Sampling takes place without interfering with the weighing operation, there is no loss of time, and personnel requirements are at a minimum. The entire quantity of milk is always kept on the weighing scale, so that the weight noted is correct without further adjustment. The apparatus is economical and portable in nature, which renders it attractive to the user and especially to small dairies which must operate with limited capital investment and labor. The sampling device affords rapid and accurate analysis of the milk, so that the dairyman and farmer know the correct value of the milk, and the dairyman is enabled to keep a correct account of the milk, especially as regards the butterfat content.

The invention is hereby claimed as follows:

1. Milk receiving apparatus including, in combination, a milk weigh tank and sampling apparatus mounted thereon for weighing therewith, said sampling apparatus including a sampler duct connected to a conveyor duct, pump means connected to said conveyor duct, and sample removing means connected to said conveyor duct, said sampler duct being mounted for extending upwardly in said tank and having a plurality of apertures spaced longitudinally in a wall thereof, said apertures decreasing in area in the direction of the normally lower end of the sampler duct, said conveyor duct being connected to said sampler duct at said lower end, said pump means being adapted for removing milk from the sampler duct and pumping the milk through the conveyor duct at a rate substantially as great as milk will enter the sampler duct through said apertures, said conveyor duct being arranged to recycle milk to said tank.

2. Milk receiving apparatus including, in combination, a milk weigh tank and sampling apparatus mounted thereon for weighing therewith, said sampling apparatus including a sampler duct connected to a conveyor duct, pump means connected to said conveyor duct, and sample removing means connected to said conveyor duct, said sampler duct being mounted for extending upwardly in said tank and having a plurality of apertures spaced longitudinally in a wall thereof, said apertures decreasing in area in the direction of the normally lower end of the sampler duct, the area being inversely proportional to the square root of $2gh$, where $g$ is the acceleration due to gravity, and $h$ is the height of the upper surface level of a body of milk in said tank above an aperture at a predetermined position of said sampler duct in the body of milk, said sampler duct being mounted for rotation about a substantially horizontal axis adjacent said lower end, whereby the position of said sampler duct is adjustable to conform to the upper surface level of said body of milk, said conveyor duct being connected to said sampler duct at said lower end, said pump means being adapted for removing milk from the sampler duct and pumping the milk through the conveyor duct at a rate substantially as great as milk will enter the sampler duct through said apertures, said conveyor duct being arranged to recycle milk to said tank.

3. Apparatus as defined in claim 2 and including float means connected to said sampler duct for maintaining a fixed point on said sampler duct coincident with said upper surface level.

References Cited in the file of this patent

UNITED STATES PATENTS

| | | |
|---|---|---|
| 942,648 | Johnson | Dec. 7, 1909 |
| 1,494,631 | Roberts | May 20, 1924 |
| 2,534,181 | Roberts | Dec. 12, 1950 |
| 2,675,706 | Edgar | Apr. 20, 1954 |

FOREIGN PATENTS

| | | |
|---|---|---|
| 656,519 | France | Jan. 2, 1929 |
| 673,751 | Germany | Mar. 27, 1939 |